(12) United States Patent
Feather

(10) Patent No.: US 6,832,576 B1
(45) Date of Patent: Dec. 21, 2004

(54) HONEYCOMB CATALYST SUBSTRATE COATING CHAMBER SEAL CLEANING SYSTEM

(76) Inventor: Keith Frederick Feather, 4478 Quail Hollow Dr., Paducah, KY (US) 42001

( * ) Notice: Subject to any disclaimer, the term of this patent is extended or adjusted under 35 U.S.C. 154(b) by 0 days.

(21) Appl. No.: 10/707,938

(22) Filed: Jan. 27, 2004

Related U.S. Application Data

(60) Provisional application No. 60/504,549, filed on Sep. 22, 2003.

(51) Int. Cl.$^7$ .............................................. B05C 13/00
(52) U.S. Cl. ........................................ 118/70; 118/429
(58) Field of Search ............................ 134/198, 166 R, 134/169 R, 104.1, 184; 118/70, 429, 696, 698

(56) References Cited

U.S. PATENT DOCUMENTS

| | | | |
|---|---|---|---|
| 4,674,521 A | * 6/1987 | Paulfus | 134/167 R |
| 5,180,431 A | * 1/1993 | Sugimoto et al. | 118/52 |
| 5,511,569 A | * 4/1996 | Mukogawa | 134/104.1 |
| 5,677,000 A | * 10/1997 | Yoshioka et al. | 427/240 |
| 6,599,570 B1 | 7/2003 | Aderhold et al. | 427/238 |
| 6,599,857 B2 | * 7/2003 | Taniguchi et al. | 502/300 |

* cited by examiner

Primary Examiner—Brenda A. Lamb

(57) ABSTRACT

The current invention reveals equipment and the method to utilize it to reduce or eliminate seal deposition in equipment that uses inflatable seals where a solution can come into contact with the seal and leave a deposit. Typical of this process is the coating chamber used to prepare honeycomb substrate for catalytic converters. For catalytic converter coating, the invention sprays the solvent of the coating solution, typically water, in a flat fan spray across the coating chamber in a high pressure pulse in such a manner as to produce a thin film of water on the seal surface, and reflect from the seal surface to clean multiple seals within the chamber. The film of water removes deposits, interferes with further nucleation, and the wet seal forms a tighter seal with less pressure. Water is pulsed with a metering pump through rigid or semi-rigid tubing to fixed spray nozzles when the substrate is removed from the coating chamber. The pulse takes less than 1 second. The unique nature of the invention minimizes and in some cases avoids the effect of coating solution dilution from the cleaning system.

11 Claims, 2 Drawing Sheets

HONEYCOMB CATALYST SUBSTRATE COATING CHAMBER SEAL CLEANING SYSTEM

This application claims benefit of 60/504,549 Sep. 22, 2003.

BACKGROUND OF INVENTION

Inflatable seals are used in industry to secure parts for processing. Where solutions are used in the processing, deposits can form on the inflatable seals, reducing the adhesion of the seal on the part, and transferring solution deposits to the part. Where the adhesion is reduced, additional pressure is required to secure the part to the inflatable seal, eventually leading to seal failure if enough pressure is applied. A typical process is catalytic converter honeycomb substrate coating. There, a solution is to be applied to the interior of a honeycomb substrate. Inflatable seals are used to secure the part in the coating system, and coating solution is passed through the interior of the honeycomb by pressure or vacuum. As the system operates, coating solution adheres to the seals. This results in insufficient sealing, which leads to coating the exterior of the substrate, part slipping, inaccurate coating, precious metal losses, and eventual shutdown. This invention allows the operator to continuously clean the sealing surfaces while running.

SUMMARY OF INVENTION

The invention described here cleans inflatable seals online. The current employment of the invention is in the catalytic converter coating industry, and is directly applicable to any industry where inflatable seals are used to secure parts. In this embodiment, a flat fan water spray is introduced to the seal surface in such a way as to clean deposits from the seal and wet the coating chamber, interfering with further deposits. The method used allows the operator to precisely control the quantity of water used for each cleaning cycle. In the current embodiment, water volumes of 0.1 to 3 milliliters per cleaning cycle have been accurately controlled.

BRIEF DESCRIPTION OF DRAWINGS

Drawing 1 shows a general arrangement of a honeycomb catalytic converter substrate coating chamber, with the invention attached. Drawing 2 shows the mounting fixture used to secure the flat fan nozzle in the orientation required.

DETAILED DESCRIPTION

Figure 1:
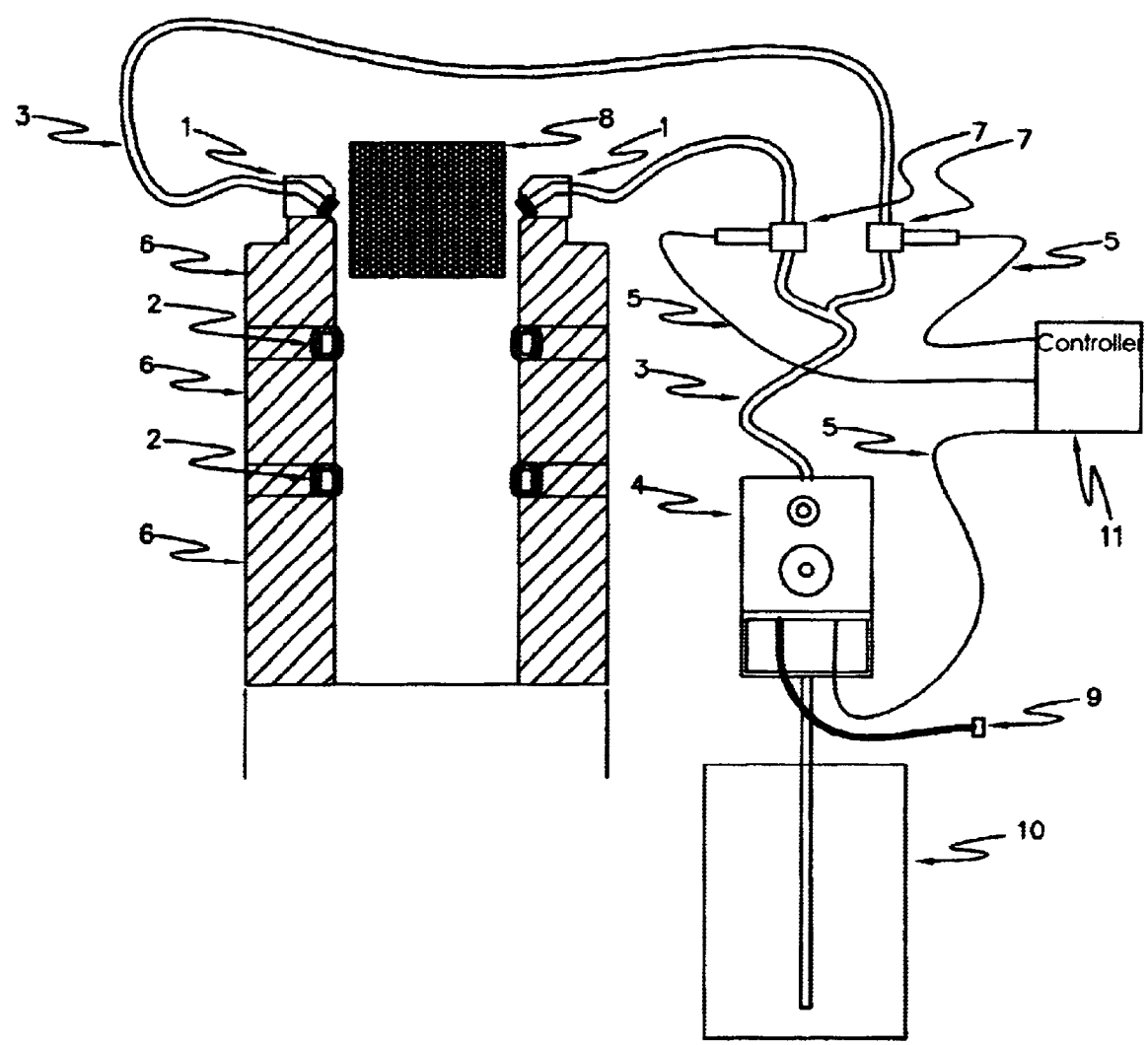
Figure 2A:
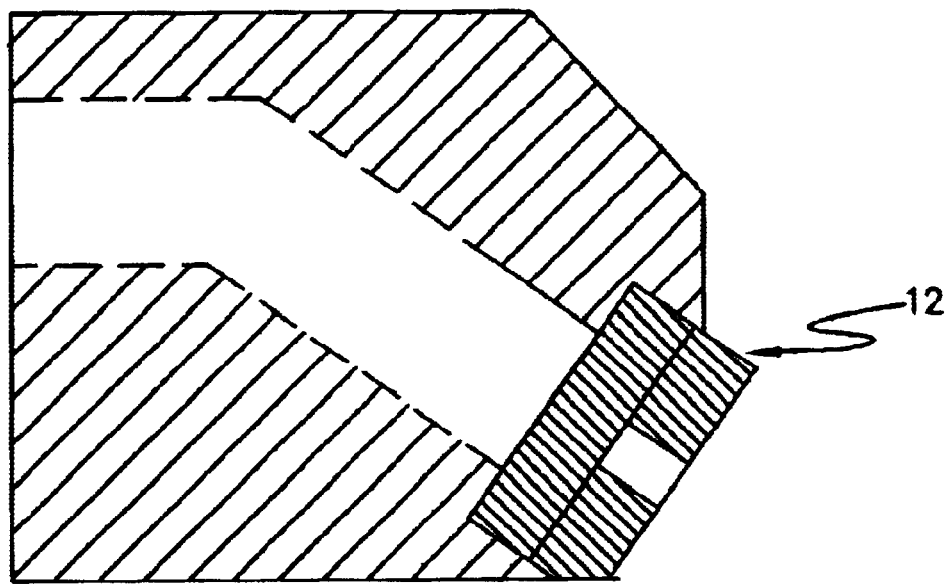
Figure 2B:
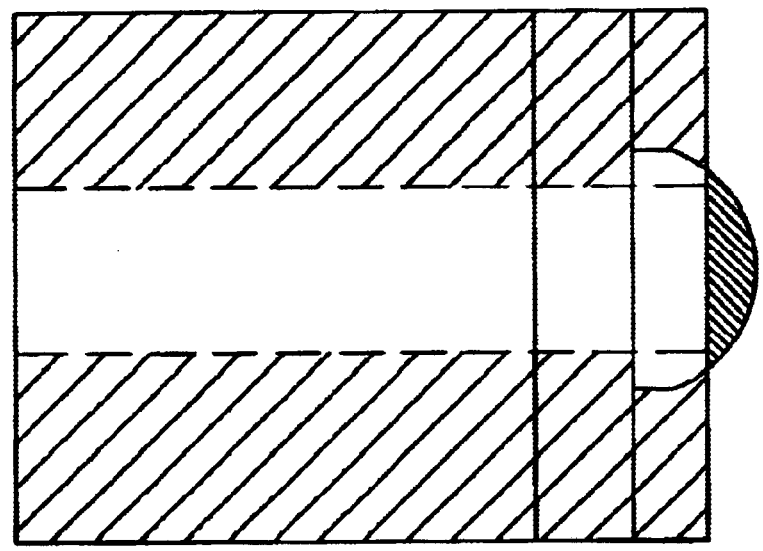

This specification is directed to the invention titled: "Honeycomb Catalyst Substrate Coating Chamber Seal Cleaning System".

The current invention reveals equipment and the method to utilize it to reduce or eliminate seal deposition in coating chambers commonly used to prepare honeycomb substrate for catalytic converters. The invention uses the solvent of the coating solution, typically water, to remove and retard the formation of deposits of coating solution on seals used to secure the substrates in the dipping chamber while the system is in operation. The unique nature of the invention minimizes and in some cases avoids the effect of coating solution dilution from the cleaning system.

This embodiment includes in its simplest form a single pair of spray nozzles precisely oriented and supplied with water in such a manner that the water reflects throughout the dipping chamber, forming a film thinner than would be achieved by other means of seal cleaning. This process also minimizes the quantity of water directly entering the coating solution below the coating chamber. The thin film of water on the dipping chamber wall adsorbs into coating solids formed as a result of water evaportion on both the chamber wall and the seals dcoatg the prior substrate coating sequence. The dilute concentration of coating solution then is removed during the chamber purge fter the subsequent part is coated. The quantity of water added to the system is below that which is normally adsorbed by the substrate during the dipping process; therefore, the invention revealed here is designed to operate throughout the coating run, typically 1000 to 20000 parts.

The benefits of this invention are readily apparent to persons skilled in automated catalyst coating. These include downtime reduction for seal cleaning, reduction or elimination of coatings on the outside of the substrate, including precious metals, consistent finished product end cap diameter for canners, and blocked cell reduction. Clean seals also provide adequate sealing for the coating chamber at lower seal pressures, resulting in less likelihood of substrate damage with thin-wall substrate.

The invention includes two high velocity fan spray nozzles mounted above the coating chamber on opposite sides, and an intermittent water supply, sequenced to alternate a single spray from each nozzle after the coated substrate is removed from the coating chamber.

In the current embodiment, the spray volume is typically 1 ml at 40 psig which may range from 20 psig to 125 psig, provided by a variable volume solenoid actuated diaphragm pump, directed downward at 30 degrees from horizontal, which may range from 15 to 45 degrees from horizontal, in a 170 degree horizontal flat fan, which may range form 80 to 180 degrees, to a point above the top seal such that the angle of incidence reflects the spray downward and back toward the spray nozzle side, above the lower seal. The seal spray takes less than 0.5 seconds in the current embodiment, occurring after each piece is coated.

The thin film of dilute coating solution formed remains on the wall, sheeting downward if an excess of water is sprayed onto the chamber and seal. In practice, the wetted surfaces formed by the invention interfere with the nucleation sites for coating deposition, thereby eliminating further deposits from forming. It has been found that a single spray applied after every fourth coating is sufficient to keep the seals clean with most coatings.

The general operation of a typical coating chamber is detailed in U.S. Pat. No. 6,599,857 US class 502/300. Referring to Drawing 1, the coating chamber (6) is a cylindrical assembly designed to contain the honeycomb substrate (8) in a manner that when the substrate is lowered into the chamber, seals (2) inflate and secure the substrate at the top and bottom. Coating solutions are then passed from the bottom through the internals of the substrate (8), the excess drained from the substrate, leaving a coating of the desired chemistry on the interior of the substrate (8). Once the coating is complete, the substrate (8) is lifted from the coating chamber (6), where a proximity sensor detects the absence of a substrate. A required overfill of the substrate results in coating solution adhering to the coating chamber above the top seal, and excess coating solution remains on the substrate as the part is removed. The coating material left in the chamber runs down over the seals, adheres to the seals, forming hard deposits in many cases, and always forms concentrated solutions, which are then transferred to the next substrate processed. Coating losses can be as high as 2% in some cases, with the material adhering to the outside of the substrate. Since at least part of the coating is precious metal, these losses are significant. If the process is allowed to continue untreated, deposits will increase to the point where system shutdown is required.

At the moment that the substrate is removed form the chamber, the seal cleaning system, the invention disclosed here, operates. The controller (11) first signals (5) one of the solenoid valves (7) which may include up to eight solenoid valves, to open, and then signals (5) the solenoid actuated diaphragm pump (4) to produce a single pulse of water from the storage vessel (10) to one of the spray nozzles (1), which may include up to eight spray nozzles. All of the transfer piping (3) is a rigid or semi-rigid pipe or tube completely filled with water. After the first pulse is complete, the controller (11) signals the first solenoid valve (7) to close, and the second to open. At that time, the controller (11) again signals the solenoid actuated diaphragm pump (4) to pulse to the second spray nozzle (1). The spray operation generally takes less than 0.5 seconds. The process is repeated as necessary to maintain clean seals, and can be operated after every piece, or intermittently. Operation using solenoid valves directly connected to a pressurized water line is anticipated, though the described embodiment is preferred due to the precise control of feed rate.

Drawing 2 shows a larger view of the spray nozzle block (1), and is comprised of a flat fan spray nozzle (12), and a machined block which controls the spray angle and allows the connection to the supply line to be horizontal. The horizontal inlet reduces the possibility of the nozzle self-draining, while not requiring the use of a check valve. The fan spray nozzle in this case is threaded for maintenance. The machined block is attached in any way to the chamber.

What is claimed is:

1. In a manufacturing processes with a cylindrical coating chamber having wall with an interior facing surface defining an interior space and at least one inflatable seal positioned within the wall having a seal face arranged to face the interior space within the chamber, the inflatable seal being in direct or indirect contact with a coating solution applied to a substrate positioned within the chamber which can adhere to the inflatable seal, the improvement consists of an inflatable seal cleaning system which is comprised of:

a. one or more spray nozzles mounted above the seal and chamber, the spray nozzles are positioned so as to direct water in a direction downwardly toward the seal in a fan pattern so as to impact the seal and a portion of the chamber above the seal with sufficient velocity to reflect the water to the opposite facing portion of the wall;

b. a pulse pump controlled by a controller to deliver individual pulses of the water to the spray nozzles at a pressure of 20 to 125 psig;

c. one or more solenoid valves controlled by the controller to direct the pulses of water to select individual spray nozzles;

d. one or more mounting blocks for securing the position of the spray nozzle relative to the chamber and the seal, the spray nozzles are secured in the mounting blocks in such a way so as to direct the water spray downward toward the seal face at an angle of 15 to 45 degrees from horizontal; and e. tubing to conduct the water from the pulse pump to the spray nozzles.

2. The device in claim 1, where the manufacturing process is the catalytic converter honeycomb coating process and the substrate is a honeycomb substrate.

3. The device in claim 2, where the spray nozzles are actuated after the coated substrate has been removed from the coating chamber.

4. The device in claim 2, where the spray nozzles are actuated multiple times after each substrate is removed from the coating chamber.

5. The device in claim 2, where the spray nozzles are actuated following a fixed number of coating operations.

6. The device in claim 1, where the spray nozzle is a flat fan spray nozzle, with between 80 degrees and 180 degrees of fan spray angle.

7. The device in claim 1, wherein the pressure of the water delivered to the spray nozzles is 40 psig.

8. The device in claim 1 wherein the water spray is directed downwardly toward the seal face at an angle of 30 degrees from horizontal.

9. The device in claim 1, wherein the mounting blocks are attached to the interior surface of the coating chamber.

10. The device in claim 1, wherein the tubing is rigid or semi-rigid.

11. The device in claim 1, where the number of solenoid valves and spray nozzles is up to eight.

\* \* \* \* \*